(12) United States Patent
Bisot et al.

(10) Patent No.: US 10,838,411 B2
(45) Date of Patent: Nov. 17, 2020

(54) METHOD, SYSTEM AND COMPUTER PROGRAM FOR ASSISTING DECISION MAKING IN CHOOSING PARTS FOR ASSEMBLY

(71) Applicant: SAFRAN AIRCRAFT ENGINES, Paris (FR)

(72) Inventors: Clémence Virginie Charlotte Bisot, Montrouge (FR); Alice Mathilde Marboeuf, Brunoy (FR); Benjamin Samson, Portsmouth, NH (US)

(73) Assignee: SAFRAN AIRCRAFT ENGINES, Paris (FR)

( * ) Notice: Subject to any disclaimer, the term of this patent is extended or adjusted under 35 U.S.C. 154(b) by 92 days.

(21) Appl. No.: 15/840,034

(22) Filed: Dec. 13, 2017

(65) Prior Publication Data

US 2018/0196412 A1    Jul. 12, 2018

Related U.S. Application Data

(60) Provisional application No. 62/434,087, filed on Dec. 14, 2016.

(51) Int. Cl.
*G05B 19/418* (2006.01)
*G06F 30/00* (2020.01)
(Continued)

(52) U.S. Cl.
CPC ... *G05B 19/41875* (2013.01); *G05B 19/4188* (2013.01); *G05B 19/41805* (2013.01);
(Continued)

(58) Field of Classification Search
CPC ........ G05B 19/41875; G05B 19/41805; G05B 19/41865; G05B 19/4188;
(Continued)

(56) References Cited

U.S. PATENT DOCUMENTS 3,538,590 A     11/1970  Bederman et al.
5,717,598 A  *  2/1998   Miyakawa ......... G05B 19/4097
                                                   700/103
(Continued)

OTHER PUBLICATIONS

Akansel, M., Emel, E., & Hacioglu, V. (2011). Optimal control of inventory accumulation in selective assembly processes. International Journal of Advanced Manufacturing Technology, 56, 729-742. (Year: 2011).*

(Continued)

*Primary Examiner* — Emilio J Saavedra
(74) *Attorney, Agent, or Firm* — Pearne & Gordon LLP

(57) ABSTRACT

The invention relates to a method of assembling parts chosen respectively from a plurality of first parts and a plurality of second parts. It comprises: for each first part and each second part of the plurality of first parts and the plurality of second parts the estimation of a defectiveness indicator for the assembly of the first part with the second part; for a batch of N assemblies is to be made, assignment (AFF) of N first parts from the plurality of first parts to N second parts from the plurality of second parts to form N pairs ({Ai, Bj}) of a first part and of a second part, said assignment being performed in such a way that said N pairs minimise a total defectiveness of the assembly. Application to the assembly of a blade and of a leading-edge reinforcement.

11 Claims, 2 Drawing Sheets

(51) Int. Cl.
*G06F 111/04* (2020.01)
*G06F 111/20* (2020.01)

(52) U.S. Cl.
CPC ....... *G05B 19/41865* (2013.01); *G06F 30/00* (2020.01); *G05B 2219/31049* (2013.01); *G06F 2111/04* (2020.01); *G06F 2111/20* (2020.01)

(58) Field of Classification Search
CPC ........... G05B 2219/31049; G06F 17/50; G06F 2217/02; G06F 2217/06
USPC ...................................................... 700/36, 95
See application file for complete search history.

(56) References Cited

U.S. PATENT DOCUMENTS

| | | | | |
|---|---|---|---|---|
| 6,101,423 | A * | 8/2000 | Csipkes | G06F 16/24578 700/117 |
| 6,434,438 | B1 * | 8/2002 | Jin | G06Q 99/00 340/3.1 |
| 9,222,362 | B2 * | 12/2015 | Ford | B22F 3/15 |
| 2002/0161674 | A1 * | 10/2002 | Scheer | G06Q 10/0631 705/28 |
| 2004/0148775 | A1 * | 8/2004 | Kobayakawa | F16N 3/12 29/888.01 |
| 2009/0287336 | A1 * | 11/2009 | Rutka | G06F 17/50 700/103 |
| 2011/0078885 | A1 * | 4/2011 | DeRoche | B23P 17/00 29/407.05 |
| 2013/0138404 | A1 * | 5/2013 | Carbonera | A61B 5/1076 703/2 |
| 2013/0331975 | A1 * | 12/2013 | Saulsbury | G05B 19/41805 700/117 |
| 2014/0083731 | A1 * | 3/2014 | Chow | G06F 1/1626 174/50 |

OTHER PUBLICATIONS

Xu, H., Kuo, S., Tsai, J., Ying, J., & Lee, G. (2014). A selective assembly strategy to improve the components' utilization rate with an application to hard disk drives. International Journal of Advanced Manufacturing Technology, 75, 247-255. (Year: 2014).*

Tan, Matthias H.Y. et al., "Generalized selective assembly", IIE Transactions, May 24, 2011, pp. 27-42, vol. 44, No. 1, XP055453417.

Nahangi, Mohammad et al., "Optimum Assembly Planning for Modular Construction Using BIM and 3D Point Clouds", 2016 Modular and Offsite Construction (MOC) Summit, Oct. 1, 2016, pp. 1-7, Edmonton, Alberta, Canada, XP055454340.

* cited by examiner

METHOD, SYSTEM AND COMPUTER PROGRAM FOR ASSISTING DECISION MAKING IN CHOOSING PARTS FOR ASSEMBLY

TECHNICAL FIELD

The field of the invention is that of mechanical part production. The invention relates more specifically to a step for assembling parts together which may require a prior machining operation, for example grinding, to make good any production defects which might make it difficult or even impossible to assemble them. It finds application in particular in the assembly of aerospace parts, for example the assembly of a blade and its leading-edge reinforcement.

THE STATE OF THE PRIOR ART

The assembly of a blade made of a composite material with its titanium leading-edge reinforcement is a time-consuming step. There may be difficulties of varying degree associated with assembling a blade and its leading-edge reinforcement, depending on their respective shapes. Sometimes assembly is only possible after manual grinding of the blade. Such grinding operations are time-consuming steps to be avoided wherever possible, since they can adversely affect the mechanical performance levels of the finished part. Sometimes even grinding is insufficient to fully make up for production anomalies and render assembly possible.

DESCRIPTION OF THE INVENTION

One objective of the invention is to obtain a high-quality assembly whilst minimising the risk of having to perform a machining operation in order to allow two mechanical parts to be assembled together, such as, for example, a grinding operation with the aim of allowing a blade and a leading-edge reinforcement to be assembled together.

In order to achieve this it proposes a method of assembling parts chosen from a plurality of first parts and a plurality of second parts. The method comprises the following steps.

For each first part and each second part from the plurality of first parts and the plurality of second parts, a step for estimating a defectiveness indicator for assembly of the first part with the second part.

For a batch of N assemblies to be made, a step for assigning N first parts from the plurality of first parts to N second parts from the plurality of second parts, in order to form N pairs of a first part and of a second part. Said assignment is performed in such a way that said N pairs minimise a total defectiveness which corresponds to the sum of the defectiveness indicators for assembly of each of the N pairs.

Some preferred, but not restrictive, aspects of this method are as follows:
  it comprises a reduction in the defectiveness indicator for assembly of a first part with a second part when the first part has been available for assembly for a period which is greater than a first threshold;
  it comprises a reduction in the defectiveness indicator for assembly of a first part with a second part when the second part has been available for assembly for a period which is greater than a second threshold.
  it comprises a reduction in the defectiveness indicator for assembly of a first part and of a second part available for assembly when no second part, which will become available for assembly with the first part during the availability of the first part for assembly, can be assembled with the first part;
  it moreover comprises a reduction in the defectiveness indicator for assembly of a first part and of a second part available for assembly, where said reduction is weighted by a factor which represents a probability that no first part, which will become available for assembly during the availability of the second part for assembly, can be assembled with the second part;
  it comprises the formation of a sub-set of said plurality of first parts constituted of the oldest first parts available for assembly, where the N first parts assigned to the N second parts belong to said sub-set of said plurality of first parts;
  it comprises the formation of a sub-set of said plurality of second parts constituted of the oldest second parts available for assembly, where the N second parts assigned to the N first parts belong to said sub-set of said plurality of second parts;
  the defectiveness indicator for assembly of a first part with a second part is estimated from geometric characteristics of the first and of the second part;
  the estimation of the defectiveness indicator for assembly of the first part with the second part comprises an attempt to align point clouds which represent the surfaces of the first and of the second part.

The invention also relates to a system and a computer program product capable of implementing this method.

BRIEF DESCRIPTION OF THE DRAWINGS

Other aspects, aims, advantages and characteristics of the invention will become more apparent on reading the following detailed description of its preferred embodiments, given as non-restrictive examples, and undertaken with reference to the appended drawings, wherein.

DETAILED DESCRIPTION OF PARTICULAR EMBODIMENTS

The invention relates to a method for assembling parts chosen from a plurality of first parts and a plurality of second parts. One embodiment example which will be described in detail hereafter relates to the assembly of a blade (first part) and of a leading-edge reinforcement (second part).

This assembly method comprises a first step consisting of selecting two parts to be assembled by means of a relevant logic process. During a second step these two parts are assembled without adhesive in order to verify that they are a good geometric match. In a third step, if necessary, grinding is performed in order to remove surplus material identified on one of the parts. In a fourth step, a verification of whether sufficient grinding has been performed is carried out. If the verification is positive, bonding of the two elements is carried out in a fifth step. The first step is therefore a determining step for the subsequent steps and the duration of the operation and the quality of the final assembly are dependent upon it.

The method according to the invention is used to optimise the choice of parts to be assembled by specifying parts to be assembled which will maximise the quality of the assembly.

In the field of optimisation, reference is generally made to minimisation of a cost-function, where this minimisation may include, in the context of the invention, the following technical objectives:

minimising the number of parts to be grinded and the mass of grinded material (when there is grinding);
   minimising the variability of the assembled part and obtaining an assembled part which meets the specification of the nominal part as closely as possible, minimising the amount of scrap;
   maintaining the rate of production (no interruptions to production);
   maintaining an order of production of blades in order to facilitate monitoring of production.

An assembly station is considered where, at different moments in time, a batch of N assemblies must be made using the parts available for assembly. By way of an illustrative example, the aim may be to make one batch of 8 assemblies per day from 16 blades and from 40 leading-edge reinforcements available.

The first plurality of parts and the second plurality of parts are not restricted to the parts available for assembly, but may include parts already present in the facility but not within the assembly station because, for example, they are undergoing inspection operations. By way of an example, 80 leading-edge reinforcements are delivered to the facility each week, but only enter the assembly station in batches of 8 to replace the available reinforcements in the assembly station which have been used each day to make the batch of 8 assemblies.

Figure 1:
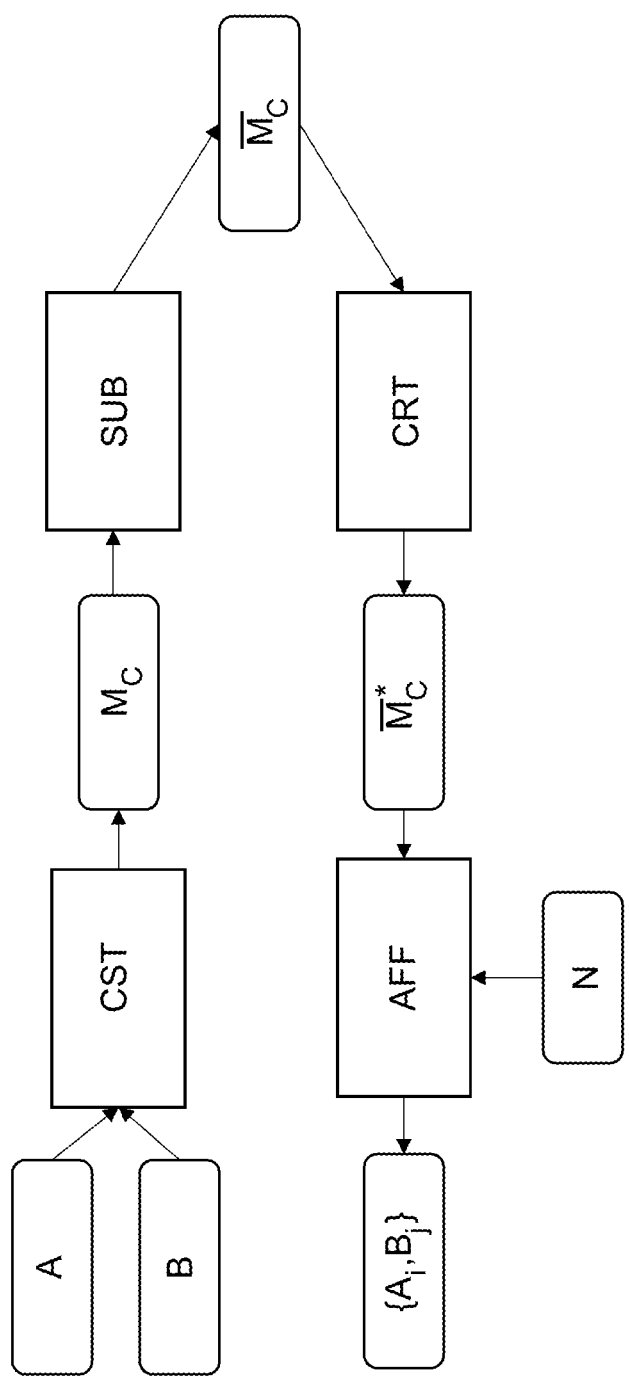
FIG. 1 shows the various steps of one possible embodiment of the method according to the invention and FIG. 2 shows the various elements of one possible embodiment of the system according to the invention.

With reference to FIG. 1, for each first part A and each second part B of the first plurality of first parts and the plurality of second parts, the method comprises a CST step for estimating a defectiveness indicator for assembly of the first part with the second part. Thus a matrix of indicators Mc is formed, which indicates, for each first part and each second part, a prediction of the defectiveness of the assembly of this first part and of this second part. In optimisation terminology, this indicator may be compared to a cost-function (here an assembly cost) which is to be minimised.

In one embodiment example the defectiveness indicator of a pair formed by a first part and a second part may be made up of two elements:

a first element associated with the quantity of material to be removed by grinding in order to carry out assembly;
   a second element associated with the discrepancy between the relative position of the assembled parts and a nominal relative position.

By seeking to minimise such a defectiveness indicator (comparable to an assembly cost), it is thus sought to minimise the quantity of material removed by grinding and to form pairs which are as close as possible to the nominal. This defectiveness indicator for assembly of a first part j and of a second part I can be expressed as $C_{ij}=G_{ij}+\|P_{ij}-P_0\|$, where $G_{ij}$ represents the quantity of grinded material and $\|P_{ij}-P_0\|$ represents a relative position of the parts in relation to a nominal position.

The defectiveness indicator for assembly of a first part and a second part may be estimated from geometric characteristics of said parts measured, for example, using tracer probes.

In one embodiment, simple geometric characteristics of the parts and a predictive model capable of learning are used to predict a probability that the assembly can be made without grinding. The greater the probability then the smaller the defectiveness indicator for the assembly of the parts is. This model is the result of a learning process using experience acquired on a certain number of pairs for which assembly has already been attempted.

By way of an example relating to the assembly of a blade and of a leading-edge reinforcement, a target distance $g_o$ between the apex of the blade and the leading-edge reinforcement may be calculated using measured geometric characteristics from a simple formula: target distance=nominal distance+measured geometric characteristics.

In parallel the measured geometric characteristics are also used to predict a distance $g_p$ between the apex of the blade and the leading-edge reinforcement using a predictive model where the learning process uses pairs for which assembly has already been attempted.

The distance $g_p$ may in particular be expressed as a linear function of certain geometric characteristics of the blade and of the leading-edge. The parameters of the linear function are learned using linear regression from data obtained on pairs for which assembly has already been attempted.

The target distance $g_o$ and the predicted distance $g_p$ are then compared. The closer they are, the greater the possibility that the pair can be assembled without grinding. On the other hand, if the difference between these distances exceeds a threshold it may be considered that the pair cannot be assembled.

Knowing $g_o-g_o$, the probability p that the pair can be assembled without grinding is calculated. This probability p is in effect a function of $g_o-g_p$ and this function may have been learned using pairs for which assembly has already been attempted.

When the pair can be assembled ($|g_o-g_p|\leq g_{lim}$), its defectiveness indicator may be expressed as $|g_p-g_{nominal}|+(1-p)*Coût_{ponçage}$, where $g_{nominal}$ corresponds to the nominal distance, p is the probability that the pair can be assembled without grinding and $Coût_{ponçage}$ corresponds to the cost of grinding (i.e. the amount of material grinded) when $|g_o\,g_p|=g_{lim}$.

In another embodiment, point clouds which represent the 3D surfaces of the first and of the second parts are used. An attempt to align these point clouds is used to predict the areas which are to be grinded (in the case where grinding must be performed) and therefore the amount of material to be removed. This alignment may be performed according to the techniques described in the thesis by Simon Flory entitled "Constrained Matching of Point Clouds and Surfaces", 2009. In this embodiment, the grinding cost is estimated more precisely, since the amount of material that will have to be removed can be estimated.

The matrix of defectiveness indicators is continuously calculated, that is, it is updated each time the geometry of a new part is known. It is also updated each time a part becomes unavailable (for example because the part has been assembled or scrapped): the line or column corresponding to the part that has become unavailable is then removed from the matrix.

It is moreover possible to take into account the fact that the geometry of certain parts is sometimes known long before the latter become available to be assembled. By way of an example, the leading-edge reinforcements are produced in a facility other than the facility where the station for assembly with the blades is located. The geometry of the leading-edge reinforcements may be measured in the original production facility and therefore known before these reinforcements are delivered to the facility where assembly is carried out. This makes a good overview of "future" reinforcements and therefore, as will be described in more detail below, improves prediction of the consequences of the choice of pairs made at a time t on choices which must be made at a later time.

With reference to FIG. 1, once the matrix of defectiveness indicators has been determined, the method according to the invention comprises, for a batch of N assemblies to be made (where N is a positive integer equal to or greater than two), the implementation of an assignment step AFF of N first parts Ai from the plurality of first parts to N second parts Bj from the plurality of second parts to form N pairs {Ai, Bj} of a first part and of a second part. The assignment is performed in such a way that said N pairs minimise a total defectiveness which corresponds to the sum of the defectiveness indicators estimated for assembly of each of the N pairs. This assignment is preferably performed so as to minimise defectiveness in the long term, by performing optimisation which involves anticipating the future.

This assignment step may be performed whenever necessary when an operator wishes to know which pairs must be assembled. This step is typically implemented every day in order to identify the N pairs which have to be made during the day.

This assignment step implements the solution of a linear assignment problem, that of determining N pairs which meet the quantitative objective of minimisation of the total defectiveness whilst maintaining the production rate (i.e. making N assemblies, for example making 8 assemblies per day) in order not to slow down production.

A linear assignment problem is a problem in which resources must be assigned to tasks. A cost is associated with each resource-task pair, and the pairs must be chosen so as to minimise the overall cost of the assignment. This problem can be written in the form $\operatorname{argmin}_{x_{i,j}}, \Sigma_{i=1}^{NB}\Sigma_{i=1}^{NA} x_{i,j} \cdot c_{i,j}$, where $c_{i,j}$ is the cost of assignment of the resource i to the task j, and $x_{i,j}$ decision variables where $x_{i,j}=1$ if the resource i is assigned to the task j, and 0 otherwise;

and under constraints according to which:
each resource is only assigned once at most: $\nabla i, \Sigma_j x_{i,j} \leq 1$;
each task is only assigned once at most: $\nabla j, \Sigma_j x_{i,j} \leq 1$;
N assignments must be made: $\Sigma_i \Sigma_j x_{i,j}=N$.

This assignment problem may be solved using the Hungarian algorithm or in accordance with linear optimisation techniques (simplex algorithm or interior point algorithm, for example).

The assignment problem may take the constraint of compliance with production rates into account in the form of a cost referred to as R which corresponds to the inability to make one of the N assemblies required (there are not enough "assemblable" parts). Thus if a first part and a second part cannot be assembled, their defectiveness indicator is R. A prohibitive indicator may be regarded as making parts incapable of being assembled, and any indicator estimated as being greater than a threshold is set to R.

The assignment problem may take other constraints into account such as, for example, giving priority to the oldest parts available for assembly. A surface treatment applied to leading-edge reinforcements to improve bond quality means that these reinforcements cannot remain at the assembly station for too long a period. If they remain there more than $\Delta t_{lim}^B$ days, for example 50 days, they must be scrapped and are therefore no longer available for assembly. The cost of such scrapping is referred to as $S^B$. On the other hand, in order to help monitor production it is preferable that the order of production for the blades is maintained for as long as possible at assembly. Thus a cost is associated with keeping a blade available for assembly (i.e. assembly takes place too late) for a time greater than $\Delta t_{lim}^A$, for example greater than 5 days, which is referred to as $D^A$.

This set of costs may be summarised in an objective function to be optimised. Between t=0 and t=T:

$$\sum_{t=0}^{T} \sum_{p=1}^{N(t)} C(B(t)_p, A(t)_p) + Nb_{B-rebut} \times S^B + Nb_{A-retard} \times D^A$$

where:
N(t) is the number of assemblies in the batch which must be made at the time t.
$B(t)_p, A(t)_p$ is one of the pairs formed at the time t by solving the assignment problem and $C(B(t)_p, Ae(t)_p)$ is the estimated defectiveness indicator for assembly of this pair:

$$C(B(t)_p, A(t)_p) = \begin{cases} R & \text{if assembly is not feasible} \\ G_{ij} + \|P_{ij} - P_0\| & \text{otherwise} \end{cases}$$

The parts in a pair formed at the instant t are chosen from the parts made available for an assembly (i.e. present at the assembly station);
$Nb_{B-rebut}$ is the number of reinforcements scrapped between 0 and T;
$Nb_{A-retard}$ is the number of blades which have been delayed at the assembly station (remaining there more than 5 days, for example) between 0 and T.

Once the N pairs are formed after the assignment step, the operator assembles these pairs at the assembly station, thus producing the batch of N assemblies. The actual defectiveness for assembly of these N pairs is recorded. In particular the amount of material grinded and the deviation from the nominal are recorded.

This information on actual assembly defectiveness (or real pairing costs) may be used continuously and automatically in the event of the operator becoming aware that a pair that has been formed cannot in fact be assembled. In this case the parts remain at the assembly station and a record is made in memory that they cannot, in fact, be assembled, so as to prevent them being proposed once again. In order for this to occur, the estimated defectiveness indicator for this pair is corrected in order to associate the cost R with it.

This information about the real pairing costs may also be used discontinuously and non-automatically to re-calibrate the defectiveness indicator prediction model. The estimated indicators predicted by this model are compared with the real costs and this comparison is used to detect any deviation of the prediction model and to re-calibrate it if necessary by repeating the learning process using new gathered data.

Still with reference to FIG. 1, in order to give priority to the assembly of certain parts, in one alternative embodiment the assignment step AFF is preceded by one and/or the other of a step SUB for selecting a sub-set of parts and a step CRT for correction of the estimated defectiveness indicators.

The step CRT for correction of the defectiveness indicators reduces an estimated defectiveness indicator for a first part and for a second part in order to favour the selection of this assembly during the assignment step. It provides a matrix of corrected indicators $\overline{M_c}$.

The aim of this reduction is, for example, to favour assembly of parts which have been available for assembly for the longest time.

Thus a reduction in the estimated defectiveness indicator of a first part with a second part can be performed when the first part has been available for assembly for a time which is greater than a first threshold. Thus a time for which a blade has been present in the assembly station for too long may be anticipated, for example of more than 3 days. The corrected indicator for this blade j, for any reinforcement which can be assembled with the blade j, is stated as $\widetilde{C_{ij}} = C_{ij} - D^A$. In other terms, if this blade does not undergo assembly at a time t, then this will cost $D^A$ since this blade will be considered to be subject to a delay during the days to come.

Alternatively, and/or in a complementary manner, a reduction is made in the estimated defectiveness indicator for assembly of a first part with a second part when the second part has been available for assembly for a period which is greater than a second threshold. Scrapping of a leading-edge reinforcement may be anticipated when it has been available for assembly for more than, for example, 43 days. The corrected indicator for this reinforcement i, for any blade j which can be assembled with the reinforcement i, is stated as $\widetilde{C_{ij}} = C_{ij} - S^B$. In other terms, if this reinforcement does not undergo assembly at a time t, then this will cost $S^B$ since this reinforcement will be scrapped during the days to come.

According to other strategies for reducing the estimated defectiveness indicator, knowledge of future parts coming to the assembly station is used to favour assembly of parts which are difficult to assemble in comparison with easy-to-assemble parts.

For example, a reduction of the estimated defectiveness indicator for the assembly of a first part with a second part is carried out where said reduction is weighted by a factor which represents a probability that no first part, which becomes available for assembly during availability of the second part for assembly, can be assembled with the second part (i.e. the estimated defectiveness indicator for assembly of the second part with each of the future first parts is equal to R). The greater the possibility of not finding, in future first parts, a first part which can be assembled with the second part, then the greater the reduction.

Considering a leading-edge reinforcement i available for assembly from $age_i(t)$ at time t, there are $N_i^t$ blades which will be available for assembly before the reinforcement i is scrapped. These are blades which would enter the assembly station during the next $\Delta t \Delta t_{lim}^B - age_i(t)$ days. The term $p_i$ is the probability that this reinforcement i can be assembled with a blade (this probability may be estimated on the basis of the ability of this reinforcement to be assembled with blades which have previously been available for assembly).

The probability that no blade, which will become available for assembly during the availability of the reinforcement i for assembly, can be assembled with the reinforcement i is $P_i^t = (1-p_i)^{N_i^t}$. The estimated defectiveness indicator for assembly of this reinforcement i, for any blade j which can assembled with the reinforcement i, is then corrected in accordance with $\widetilde{C_{ij}} = C_{ij} - S^B \times P_i^t$. This reduction may be accompanied by the reduction favouring the oldest blades as described above.

According to another example of strategy for reducing the estimated defectiveness indicator which makes use of knowledge of future parts coming to the assembly station, the estimated defectiveness indicator for assembly of a first part with a second part is reduced when no second part, which is available for assembly with the first part during the availability of the first part for assembly, can be assembled with the first part (i.e. the estimated defectiveness indicator for the first part with each of the future second parts is equal to R). This other example may be implemented jointly with the above example including the probability $P_i^t$.

Considering a blade j available for assembly from $age_j(t)$ at time t, there is a set of reinforcements $\mathcal{L}_j^t$ which will become available for assembly with the blade j before the blade j is considered to be too old (i.e. within the next $\Delta t$ $\Delta t_{lim}^A - age_j(t)$ days). If, in the set $\mathcal{L}_j^t$, no reinforcement can be assembled with the blade j, the defectiveness indicator for any reinforcement i that can be assembled with the blade j is corrected according to $\widetilde{C_{ij}} = C_{ij} - D^A$. Otherwise no correction is made.

The following description relates to the step SUB for selecting a sub-set of parts in order to form a sub-matrix of indicators $\overline{M_c}$. This selection may in particular involve forming a sub-set of said plurality of first parts made up of the oldest first parts available for assembly. During the assignment step AFF, the N first parts assigned to the N second parts belong to said sub-assembly of said plurality of first parts.

For example, each time that a batch of N assemblies is to be made, the smallest sub-assembly of blades which can be used to make N assemblies with the set of reinforcements is selected. This selection is made by including the blades in the sub-set depending on the length of time they have been in the assembly station. The resulting sub-set is referred to as $\mathcal{B}(t)$.

This selection requires knowledge of the maximum number of possible assemblies starting from a given set of blades and a given set of reinforcements. This is possible by representing the sets of blades and of reinforcements in a binary bipartite graph linking the set of blades to the set of reinforcements with an edge i,j if the pair i,j can assembled. An algorithm for maximum cardinality matching in a bipartite graph, such as, for example, the Ford-Fulkerson algorithm, is used to determine the number of possible assemblies.

The step SUB for selecting a sub-set of parts may also involve forming a sub-set of said plurality of second parts made up of the oldest second parts available for assembly. During the assignment step AFF, the N second parts assigned to the N first parts then belong to said sub-set of said plurality of second parts.

For example once the sub-set of blades $\mathcal{B}(t)$ is selected, the smallest sub-set, referred to as $\mathcal{L}(t)$, of reinforcements which can be used to make the N assemblies with the blades of sub-set $\mathcal{B}(t)$ is selected. This selection is made by including the reinforcements in the sub-set $\mathcal{L}(t)$ depending on the length of time they have been in the assembly station.

Alternatively, the formation of a sub-set $\mathcal{L}'(t)$ of said plurality of second parts is performed in such a way that the second parts of said sub-set $\mathcal{L}'(t)$ are used, with the first parts of said sub-set $\mathcal{B}(t)$ of first parts, to make M assemblies without machining, where M corresponds to the number of assemblies without machining which can be made with the second parts of said plurality of second parts and the first parts of said sub-set $\mathcal{B}(t)$ of said plurality of first parts. During the assignment step AFF, the N second parts assigned to the N first parts then belong to said sub-set $\mathcal{L}'(t)$ of said plurality of second parts.

In this alternative, once the sub-set of blades $\mathcal{B}(t)$ is selected, the smallest sub-set $\mathcal{L}'(t)$ of reinforcements which can be used to make N assemblies with the blades of sub-set $\mathcal{B}(t)$ and to make M assemblies without grinding is selected.

M corresponds to the number of assemblies without grinding that it is possible to make with the blades of the sub-set $\mathcal{B}(t)$ and the set of reinforcements. In such a manner the assignment is carried out with the oldest reinforcements without adversely affecting the number of assemblies that can be made without grinding.

In one practical application of the algorithm, the number M is not in actual fact precisely known, since it is simply possible to estimate a probability that a pair can be made without grinding or not. Thus there is not a number M of assembles that can be made without grinding, but an estimate m of the expected value of the number of assemblies that can be made without grinding if the pairs are made with the blades of the sub-set $\mathcal{B}(t)$ and the set of reinforcements. Thus the sub-set of reinforcements $\mathcal{L}'(t)$ is chosen which can be used to make N assemblies with the blades of the sub-set $\mathcal{B}(t)$ and give an expected value m' of the number of assemblies that can be made without grinding (from amongst the N chosen pairs) which is close to the expected value: Thus $m-m'<\in$ is sought where $\in$ is a threshold defined depending on the applications.

Figure 2:
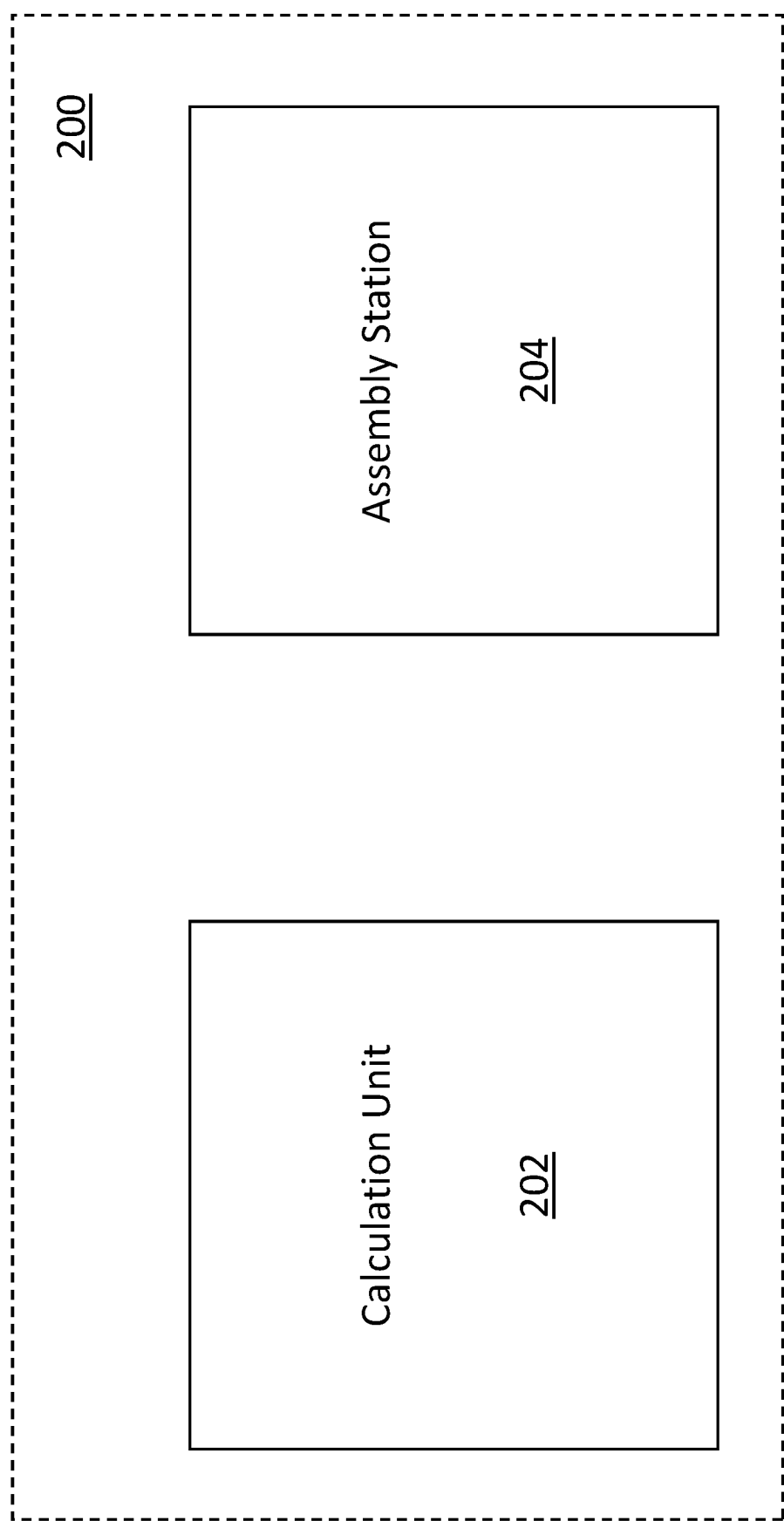

With reference to FIG. 2, the invention is not limited to the method as described above, but also extends to a system 200 for helping decision-making for assembly of a first part and of a second part chosen respectively from a plurality of first parts and a plurality of second parts, which comprises an assembly station 204 for assembling the first part and the second part, and a calculation unit 202 configured to implement this method, and in particular:

to estimate, for each first part and each second part in the plurality of first parts and the plurality of second parts, a defectiveness indicator for assembly of the first part with the second part;

to assign, when a batch of N assemblies is to be made, N first parts from the plurality of first parts to N second parts from the plurality of second parts by forming N pairs of a first part and of a second part, said assignment being performed in such a way that said N pairs minimise a total defectiveness of assembly which corresponds to the sum of the estimated defectiveness indicators for assembly of each of the N pairs.

The invention also relates to a non-transitory medium which can be read by a computer which stores program code instructions for executing the estimation and assignment steps of the method when said instructions are executed on the computer.

The invention claimed is:

1. An assembly method for parts chosen from a plurality of first parts and a plurality of second parts, comprising the steps of:

for each first part and each second part from the plurality of first parts and the plurality of second parts, estimating, using a calculation unit, a quantity of material to be grinded so that the first part and the second part can be assembled, and a discrepancy between a relative position of the assembled first and second parts and a nominal relative position, wherein a sum of the estimated quantity and of the estimated discrepancy is a defectiveness indicator for an assembly of the first part with the second part;

reducing said defectiveness indicator when the first part has been available for assembly for a period which is greater than a first threshold or when the second part has been available for assembly for a period which is greater than a second threshold;

for a batch of N assemblies to be made, assigning by the calculation unit N first parts from the plurality of first parts to N second parts from the plurality of second parts to form N pairs of a first part and of a second part, wherein said N pairs minimise a total defectiveness, the total defectiveness being the sum of the defectiveness indicators for the assembly of the first part with the second part for each of the N pairs; and assembling the N pairs of a first part and of a second part to produce the batch of N assemblies.

2. The method according to claim 1, wherein the plurality of first parts are blades and the plurality of second parts are leading-edge reinforcements.

3. The method according to claim 1, further comprising a step implemented by the calculation unit of reducing the defectiveness indicator for the assembly of the first part with the second part available for assembly when no second part, which will become available for assembly with the first part during the availability of the first part for assembly, can be assembled with the first part.

4. The method according to claim 1, further comprising a step implemented by the calculation unit of reducing the defectiveness indicator for the assembly of the first part with the second part available for assembly, said reduction being weighted by a factor which represents a probability that no first part, which will become available for assembly during the availability of the second part for assembly, can be assembled with the second part.

5. The method according to claim 1, further comprising a step implemented by the calculation unit of forming a sub-set of said plurality of first parts, said sub-set being composed of first parts among the plurality of first parts that have been available for assembly for the longest time, and wherein the N first parts assigned to the N second parts belong to said sub-set of said plurality of first parts.

6. The method according to claim 5, further comprising a step implemented by the calculation unit of forming a sub-set of said plurality of second parts, said sub-set being composed of second parts among the plurality of second parts that have been available for assembly for the longest time and wherein the N second parts assigned to the N first parts belong to said sub-set of said plurality of second parts.

7. The method according to claim 6, wherein forming the sub-set of said plurality of second parts is performed in such a way that the second parts of said sub-set of said plurality of second parts can be used with the first parts of said sub-set of first parts, to make M assemblies without machining, where M corresponds to the number of assemblies without machining which can be made with the second parts of said plurality of second parts and the first parts of said sub-set of said plurality of first parts.

8. The method according to claim 1, wherein the defectiveness indicator for the assembly of the first part with the second part is estimated from geometric characteristics of the first part and of the second part.

9. The method according to claim 8, wherein estimating the defectiveness indicator for the assembly of the first part with a second part comprises matching point clouds which represent surfaces of the first and of the second part.

10. A system for assembling parts chosen from a plurality of first parts and a plurality of second parts, comprising:

a calculation unit, configured:

to estimate, for each first part and each second part in the plurality of first parts and the plurality of second parts, a quantity of material to be grinded so that the first part and the second part can be assembled, and a discrepancy between a relative position of the assembled first and second parts and a nominal relative position, wherein a sum of the estimated quantity and of the estimated discrepancy is a defectiveness indicator for an assembly of the first part with the second part;

to reduce said defectiveness indicator when the first part has been available for assembly for a period which is greater than a first threshold or when the second part has been available for assembly for a period which is greater than a second threshold; and to assign, when a batch of N assemblies is to be made, N first parts from the plurality of first parts to N second parts from the plurality of second parts thereby forming N pairs of a first part and of a second part, wherein said N pairs minimise a total defectiveness, the total defectiveness being the sum of the defectiveness indicators for the assembly of the first part with the second part for each of the N pairs; and an assembly station used for making the batch of N assemblies by assembling the N pairs of a first part and of a second part.

11. A non-transitory medium which can be read by a computer and stores program code instructions for executing the estimation and assignment steps of the method according to claim 1 when said instructions are executed on the computer.

* * * * *